(12) United States Patent
Kasama et al.

(10) Patent No.: US 6,631,227 B2
(45) Date of Patent: Oct. 7, 2003

(54) INFORMATION RECORDING AND REPRODUCING APPARATUS

(75) Inventors: Nobuyuki Kasama, Chiba (JP); Manabu Oumi, Chiba (JP); Yasuyuki Mitsuoka, Chiba (JP); Hidetaka Maeda, Chiba (JP); Kenji Kato, Chiba (JP); Takashi Niwa, Chiba (JP)

(73) Assignee: Seiko Instruments Inc. (JP)

( * ) Notice: Subject to any disclaimer, the term of this patent is extended or adjusted under 35 U.S.C. 154(b) by 106 days.

(21) Appl. No.: 09/833,144

(22) Filed: Apr. 11, 2001

(65) Prior Publication Data

US 2002/0009262 A1 Jan. 24, 2002

(30) Foreign Application Priority Data

Apr. 18, 2000 (JP) .......................... 2000-116560

(51) Int. Cl.[7] .................................. G02B 6/34
(52) U.S. Cl. .............. 385/36; 369/112.01; 369/112.09; 369/112.28; 369/44.15; 369/44.19; 369/118; 385/37; 385/140
(58) Field of Search ................. 385/36, 37; 369/112.01, 369/112.03–112.09, 112.18, 112.21, 112.27–112.28, 44.14–44.16, 44.19, 44.23–44.24, 13.33, 13.32, 18

(56) References Cited

U.S. PATENT DOCUMENTS

| 5,793,407 | A  |   | 8/1998  | Park et al. ................. 347/258 |
| 6,094,803 | A  | * | 8/2000  | Carlson et al. ............ 29/602.1 |
| 6,243,350 | B1 | * | 6/2001  | Knight et al. ............... 369/126 |
| 6,304,527 | B1 |   | 10/2001 | Ito et al. ................. 369/44.23 |

FOREIGN PATENT DOCUMENTS

| EP | 0978829  | 2/2000 |
| JP | 61130906 | 6/1986 |
| JP | 11265520 | 9/1999 |
| JP | 00113485 | 4/2000 |

* cited by examiner

Primary Examiner—Robert H. Kim
Assistant Examiner—George Y. Wang
(74) Attorney, Agent, or Firm—Adams & Wilks

(57) ABSTRACT

An information recording and reproducing apparatus for at least one of recording and reproducing information on a recording medium utilizing near-field light has a suspension arm and a near-field light head mounted on the suspension arm. The near-field light head has a minute aperture, an optical waveguide for propagating light from a light source, and a reflection film for reflecting the light propagated by the optical waveguide and for irradiating the reflected light to the minute aperture to generate near-field light at the minute aperture for interaction with a recording medium. A light guiding structure guides light from the light source to the optical waveguide of the near-field light head.

27 Claims, 9 Drawing Sheets

INFORMATION RECORDING AND REPRODUCING APPARATUS

BACKGROUND OF THE INVENTION

1. Field of the Invention

The present invention relates to an information recording and reproducing apparatus for recording and reproducing information having a high density by utilizing a near-field light generating element having a very small opening for generating near-field light as a near-field light head.

2. Description of the Related Art

A near-field light generating element is currently utilized as a near-field light head of an information recording and reproducing apparatus or a probe for carrying out optical observation of a sample or an investigation thereof is started.

An information recording and reproducing apparatus using light evolves in a direction of high capacity formation and small size formation and high density formation of record bits is requested therefor. As a countermeasure thereof, there have been carried out researches using a blue purple color semiconductor laser or SIL (Solid Immersion Lens), however, according to the technologies, owing to a problem of the diffraction limit of light, there can be expected promotion of a record density about several times as much as the current record density. In contrast thereto, there is expected an information recording and reproducing method utilizing near-field light as a technology of dealing with optical information of a very small region exceeding the diffraction limit of light.

According to the technology, there is utilized near-field light generated by an interactive action between a very small region and an optical opening having a size equal to or smaller than the wavelength of light and formed at a near-field light head constituting a near-field light generating element. Thereby, there can be dealt with optical information in a region equal to or smaller than the wavelength of light which is regarded as a limit in a conventional optical system. A method of reproducing optical information is carried out by a method in which by irradiating light to a surface of a record medium, much of near-field light localized at a very small mark is converted into scattered light by an interactive action between near-field light and a very small opening (collection mode), or a method in which near-field light generated by a very small opening is irradiated to a surface of a record medium and scattered light converted by an interactive action between the near-field light and very small irregularities recorded with information of the surface of the record medium or a change in an optical constant such as refractive index, is detected by a light receiving element separately provided (illumination mode). Recording is carried out by irradiating near-field light generated at a very small opening to a surface of a record medium to thereby change a shape of a very small region on media (heat mode recording) or changing the refractive index or the transmittance of the very small region (photon mode recording). By using the near-field light head having the optical very small opening exceeding the diffraction limit of light, there is achieved high density formation of record bits exceeding that of a conventional optical information recording and reproducing apparatus.

In such a situation, generally, a constitution of a recording and reproducing apparatus utilizing near-field light is substantially similar to that of a magnetic disk apparatus and in place of a magnetic head, a near-field light head is used. A near-field light head having an optical very small opening attached to a front end of a suspension arm, is floated up to a constant height by the flying head technology and is made to access to an arbitrary data mark present on the desk. In order to make the near-field light head follow the disk rotating at high speed, there is provided a flexure function for stabilizing an attitude of the head in correspondence with waviness of the disk.

According to the near-field light head having such a constitution, as a method of supplying light to an opening, there is provided means for connecting an optical fiber or an optical waveguide to the near-field light head from above or a horizontal direction or irradiating light flux from a laser provided above the near-field light head directly to the near-field light head.

Further, by using an optical fiber probe or a cantilever type optical probe which is represented by a near-field optical microscope and an opening portion of which is sharpened by fabricating an optical fiber, while maintaining a position relative to media by an interactive action of tunnel current or atomic force produced between a probe in a scanning type probe microscope and a surface of a sample, recording, reproducing and observing of information are realized.

Further, there is proposed use of a planar probe formed with an opening having an inverse pyramid structure on a silicon substrate by anisotropic etching. Light is made incident from above or a horizontal direction and by reflection at inside of the pyramid in a shape of an inverse cone, near-field light is generated from an opening present at an apex thereof. The probe is not provided with a sharpened front end, mentioned above, and therefore, the probe can be used as a near-field light head such as a light head or a probe suitable for high-speed recording and reproducing or high-speed observation. According to such a near-field light head, in fabricating an upper face of a substrate and a lower face of the substrate, there are used two sheets or more of photomasks which are finely aligned at two faces of the substrate and the structure of the near-field light head is fabricated by the photolithography technology. However, it is difficult to align the two faces of the photomasks with ultra high accuracy, further, it is very difficult to control a shape of the very small opening owning to an error in a thickness of the substrate or a lattice defect of the substrate. Hence, there is devised a near-field light head fabricated with a very small opening and an optical waveguide for guiding light to the very small opening only at one face of the substrate. Further, by constituting such a structure, smaller size formation and thin shape formation can be carried out.

However, according to the above-described structure of the near-field light head, the very small opening and the optical waveguide for guiding light to the very small opening are fabricated on the same side of the substrate to face a side of a record medium. According to an information recording and reproducing apparatus utilizing near-field light in which a distance between the record medium and the very small opening needs to be about several tens nanometers, there poses a problem that there is not a space for connecting an optical fiber directly to the optical waveguide above the near-field light head, light cannot be made incident from outside on the near-field light head and it is difficult to supply light for generating near-field light by using the near-field light head to the near-field light head.

SUMMARY OF THE INVENTION

Therefore, it is an object of the invention to provide an information recording and reproducing apparatus for supplying light for generating near-field light to a near-field light head, generating a sufficiently large amount of near-field light from a very small opening and realizing reproduction and recording with ultra high resolution, recording and reproduction at high speed and high SN ratio formation in an information recording and reproducing apparatus using the near-field light head in which the very small opening and an optical waveguide for guiding light to the very small opening are fabricated on the same side.

Hence, in order to achieve the above-described object, according to a first aspect of the invention, there is provided an information recording and reproducing apparatus which is an information recording and reproducing apparatus comprising a record medium, a light source, a suspension arm, a flexure fixed to the suspension arm, a near-field light head fixed to the flexure and having a very small opening on a side of the record medium, a light guiding structure for guiding light flux from the light source to the near-field light head, and a light receiving portion, for recording or reproducing information by utilizing near-field light, wherein the very small opening and an optical waveguide for guiding light to the very small opening are disposed on a same side of the near-field light head and the light guiding structure comprises an optical propagating portion fixed to the suspension arm, an optical coupling portion fixed to the near-field light head, and an optical connecting portion for optically connecting the optical propagating portion and the optical coupling portion.

Therefore, there can be provided the information recording and reproducing apparatus capable of supplying the light for generating the near-field light to the near-field light head by supplying the light flux from the light source by the optical propagating portion and the optical connecting portion and the optical coupling portion, generating a sufficiently large amount of the near-field light at a vicinity of the very small opening of the near-field light head and realizing reproduction and recording with ultra high resolution, recording and reproduction at high speed and high SN ratio formation even in the information recording and reproducing apparatus using the near-field light head in which the very small opening and the optical waveguide for guiding light to the very small opening are fabricated on the same side.

Further, according to a second aspect of the invention, there is provided the information recording and reproducing apparatus wherein the optical coupling portion comprises a prism and a gap.

Therefore, in addition to the effect of the information recording and reproducing apparatus according to the first aspect of the invention, the light flux from the light source can be supplied to the near-field light head by a simple constitution and accordingly, the low cost formation can be achieved.

Further, according to a third aspect of the invention, there is provided the information recording and reproducing apparatus wherein the optical coupling portion comprises a diffraction grating.

Therefore, in addition to the effect of the information recording and reproducing apparatus according to the first aspect of the invention, the light flux is coupled to the waveguide by using the diffraction grating and accordingly, in comparison with the case of using the prism, the mass at a surrounding of the near-field optical head can be lightened, tracking at higher speed can be carried out and data reproduction at higher speed can be carried out. Furthermore, the optical coupling portion can be fabricated only by a process similar to the process of fabricating the near-field light head and accordingly, mass production can be carried out and low cost formation can be achieved.

Further, according to a fourth aspect of the invention, there is provided the information recording and reproducing apparatus wherein the optical coupling portion comprises optical waveguides laminated to overlap by two stages or more.

Therefore, in addition to the above-described effect, adjustment is facilitated by reducing a number of parts, adjusting portions are reduced and lower cost formation can be achieved. Further, the mass of the near-field light head can be lightened and accordingly, tracking at faster speed can be carried out and data production at higher speed can be carried out.

Further, according to a fifth aspect of the invention, there is provided the information recording and reproducing apparatus wherein the optical coupling portion and the optical connecting portion comprise at least one optical waveguide.

Therefore, in addition to the effect of the information recording and reproducing apparatus according to the first aspect of the invention, it is not necessary to fabricate a clad portion of the optical waveguide fabricated in the near-field light head and accordingly, the fabrication process can be simplified. Further, the number of parts can be reduced and accordingly, in comparison with the case of using the prism or the diffraction grating, optical adjustment is much simplified, adjusting portions are reduced by reducing the number of parts and lower cost formation can be carried out. Further, the mass of the near-field light head can be lightened and therefore, tracking at higher speed can be carried out and data reproduction at higher speed can be carried out.

Further, according to a sixth aspect of the invention, there is provided the information recording and reproducing apparatus wherein the optical propagating portion comprises an optical waveguide and a lens for focusing the light flux from the light source to an end face of the optical waveguide.

Therefore, in addition to the above-described effect, the optical propagating portion is constituted by the lens and the optical waveguide for propagating the light flux to the optical connecting portion and accordingly, the optical propagating portion can be fixed to the suspension arm and thin shape formation of the apparatus can be carried out. Further, it is possible to overlap the record media and arrange suspension arms and near-field light heads in correspondence with the respective record media and large capacity formation can be realized.

Further, according to a seventh aspect of the invention, there is provided the information recording and reproducing apparatus wherein the optical propagating portion comprises a lens for making the light flux from the light source parallel light flux.

Therefore, in addition to the effect of the information recording and reproducing apparatus according to the first through the fourth and the sixth aspects of the invention, the optical waveguide of the optical propagating portion can be omitted and accordingly, adjustment is further facilitated by reducing the number of parts and a small-sized and light-weighted information recording and reproducing apparatus can be realized.

Further, according to an eighth aspect of the invention, there is provided the information recording and reproducing apparatus wherein the optical connecting portion comprises a mirror for changing an optical path such that light flux from the optical propagating portion is made incident on the optical coupling portion.

Therefore, in addition to the effect of the information recording and reproducing apparatus according to the first through the fourth, the sixth and the seventh aspects of the invention, in order to couple the light flux from the optical propagating portion to the optical coupling portion, the light flux is bent by the mirror and aerial propagation can be used for the light flux to the near-field light head and accordingly, the flexure structure can effectively be operated and the near-field light head can continue floating up stably. Furthermore, at the location of the aerial propagation, there is constituted a space in which nothing is present and accordingly, mass of the light propagating portion can be lightened and a further light-weighted information recording and reproducing apparatus can be realized.

Further, according to a ninth aspect of the invention, there is provided the information recording and reproducing apparatus wherein the optical connecting portion comprises a diffraction grating for changing an optical path such that light flux from the light propagating portion is made incident on the optical coupling portion.

Therefore, in addition to the effect of the information recording and reproducing apparatus according to the first through the fourth and the sixth through the eighth aspects of the invention, the diffraction grating can freely be designed and accordingly, the light flux having an optimum light distribution can be made incident on the optical coupling portion and accordingly, optical energy can be utilized further effectively.

DETAILED DESCRIPTION OF THE PREFERRED EMBODIMENTS

A detailed explanation will be given of an information recording and reproducing apparatus according to the invention in reference to the drawings as follows. Further, the invention is not limited by the embodiments.

Embodiment 1

Figure 1:
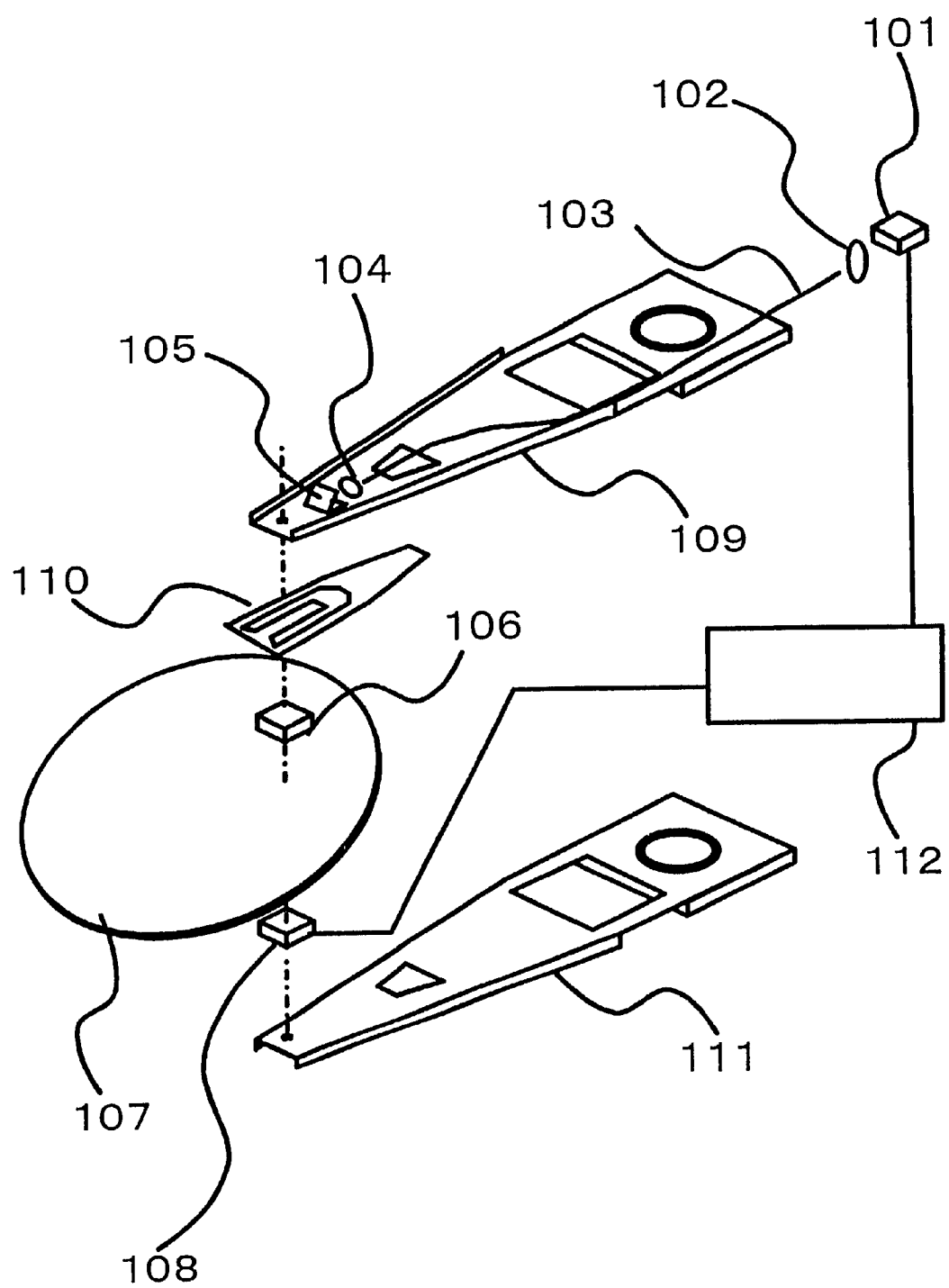
FIG. 1 is a view showing an outline of an information recording and reproducing apparatus according to Embodiment 1 of the invention.

FIG. 1 shows an outline of an information reproducing apparatus according to Embodiment 1 of the invention. Although a suspension arm 109, a flexure 110 and a near-field light head 106 having an optical coupling portion and a suspension arm 111 and a light receiving head 108 are illustrated respectively in disassembled forms in order to facilitate to understand the outline of the information recording and reproducing apparatus, actually, the respective portions are connected and are fixed as necessary.

The information reproducing apparatus according to the embodiment is similar to the conventional magnetic disk apparatus in the basic constitution in which the flexure 110 is formed at a front end portion of the suspension arm 109 in order to float up the near-field light head 106 having the optical coupling portion in always constant arrangement relative to a record medium 107 by rotating the record medium 107 at high speed in a state in which the near-field light head 106 having the optical coupling portion and having a very small opening (not illustrated) for generating near-field light is made proximate to a surface of the record medium 107 by several tens nanometers. The suspension arm 109 is made movable in the radius direction of the record medium 107 by a voice coil motor (not illustrated). Here, the near-field light head having the optical coupling portion is arranged such that the very small opening is opposed to the record medium 107.

A light propagating portion for guiding light flux of a laser 101 to a vicinity of the flexure 110 is constituted by a lens 102 and an optical fiber 103 fixed to the suspension arm 109. An optical connecting portion for optically connecting the light propagating portion and the near-field light head 106 having the optical coupling portion is constituted by a lens 104 and a mirror 105.

Here, although the optical fiber 103 is used, an optical waveguide or aerial optical propagation may be used therefor. Further, the laser 101 may be subjected to intensity modulation by a circuit system 112 as necessary.

Figure 3:
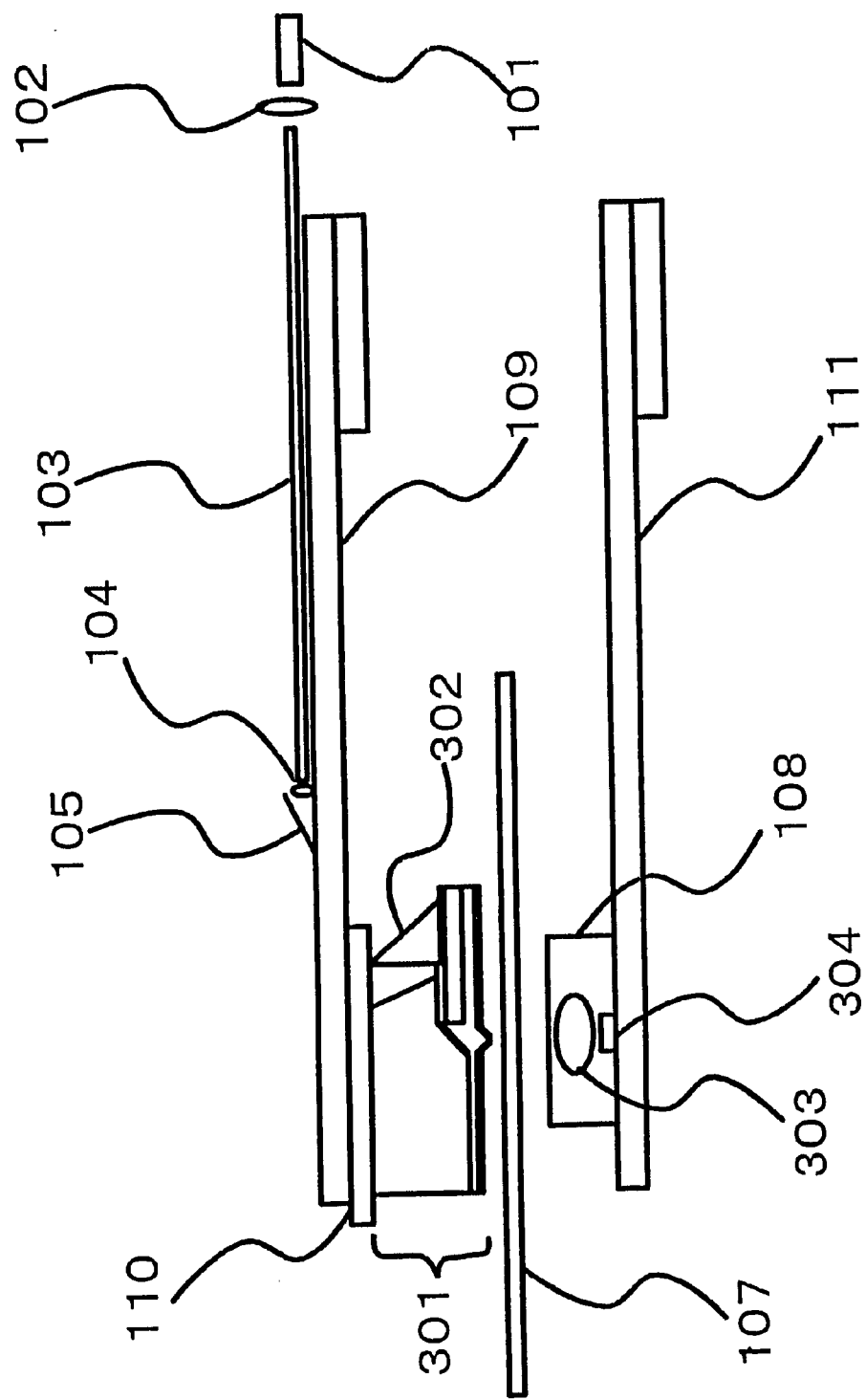
FIG. 3 is a sectional view showing the information recording and reproducing apparatus according to Embodiment 1 of the invention.

FIG. 3 shows a sectional view of the information reproducing apparatus according to Embodiment 1. The near-field light head having the optical coupling portion is constituted by a near-field light head 301 and a prism 302 which is the optical coupling portion fixed to the near-field light head 301. Further, the light receiving head 108 is constituted by a lens 303 and a light receiving element 304 for receiving efficiently scattered light generated as a result of an interactive action between near-field light generated at the very small opening and the record medium 107.

Figure 4:
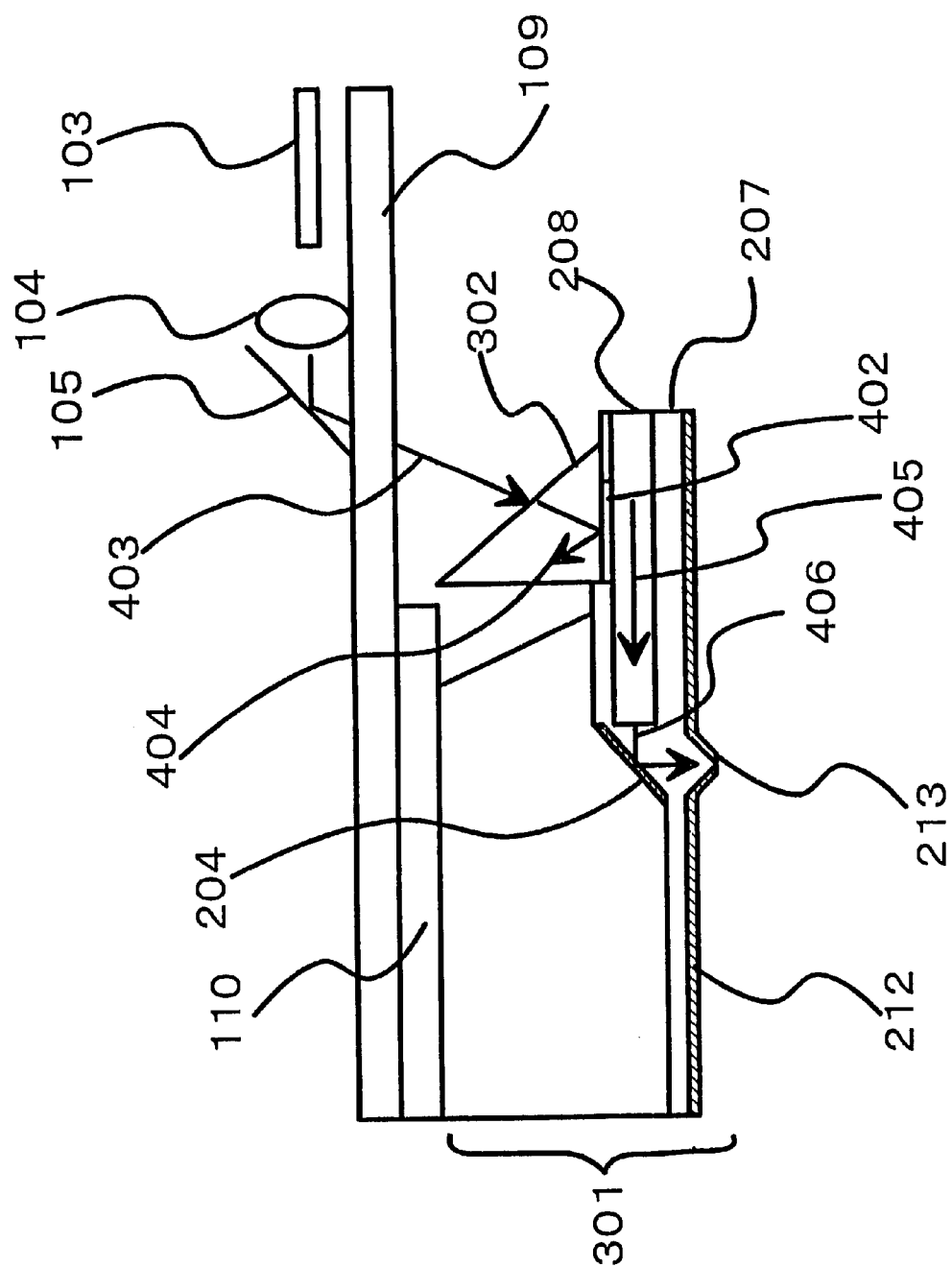
FIG. 4 is an enlarged view showing a vicinity of a near-field light head of the information reproducing apparatus according to Embodiment 1 of the invention.

FIG. 4 shows an enlarged view of a vicinity of the near-field light head of the information recording and reproducing apparatus according to Embodiment 1.

According to the near-field light head 301, a minute aperture (hereinafter "a very small opening") 213 and a core 208 and a clad 207 constituting an optical waveguide for guiding light to the very small opening 213 are formed on the same side of a silicon substrate.

FIG. 2 show a method of fabricating the near-field light head 301.

Figure 2A:
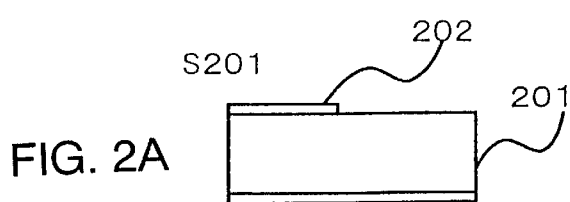
FIGS. 2A to 2J is a view showing a method of fabricating a near-field light head of an information reproducing apparatus according to Embodiment 1 of the invention.

First, at step S201 shown by FIG. 2A, there is used a silicon substrate of a single crystal having face orientation (100). Thermally oxidized films or silicon oxide films constituting masks 202 and 203 are laminated on two faces of the substrate by a CVD (Chemical Vapor Deposition) process or a sputtering process. For the mask member, there may be used silicon nitride or a nonalkaline soluble species metal other than these. Windows having desired sizes are opened at the mask member by using the lithography method and silicon at portions for etching is exposed.

Figure 2B:

Thereafter, at step S202 shown by FIG. 2B, by using potassium hydroxide (KOH) or tetramethylammoniumhydroxide (TMAH), the silicon substrate 201 is subjected to wet etching to thereby form a stepped difference, form an inclined face which is (111) face having an angle of 54.71 relative to (100) face and remove the masks 202 and 203. Successively, there is formed to laminate a reflective film 204 comprising a metal film of aluminum, silver, gold or the like or a dielectric multiple layer film such that light propagated from a horizontal direction to an upper face of the fabricated inclined face can be supplied in a direction of an opening.

Figure 2C:
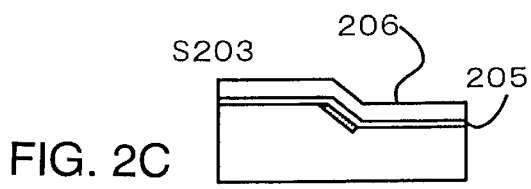

Thereafter, at step S203 shown by FIG. 2C, as a material of an optical waveguide for propagating light to a bottom portion of a stepped difference, there are deposited a quartz species material such as silicon oxide or silicon nitride or a dielectric material of polymer such as polyimide or polymethacrylic acid of a low refractive index layer 205 and a high refractive index layer 206. In the case of silicon oxide which is a dielectric material, silicon oxide can easily be formed by a sputtering process, a CVD process or a vacuum deposition process. For making the refractive index larger, germanium may be doped in forming the film and for making the refractive index smaller, fluorine may be doped in forming a clad film.

Figure 2D:
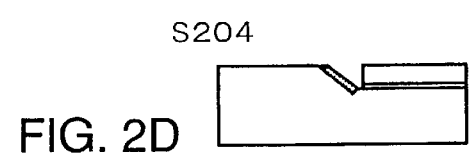

Thereafter, at step S204 shown by FIG. 2D, the shape of the optical waveguide is adjusted by using the photolithography technology and etching. By using the photolithography technology used in a normal semiconductor fabricating step, patterning is carried out by laminating a mask member protecting etching above the optical waveguide. Thereafter, the optical waveguide can be patterned by etching the material of the optical waveguide and removing the mask member.

Figure 2E:
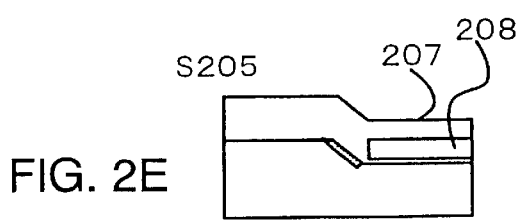

Next, at step S205 shown by FIG. 2E, a TEOS (Tetraethoxysilane: $Si(OC_2H_5)_4$) film is formed to laminate above upper faces of the reflective layer 204 and the optical waveguide to thereby form an optical waveguide by a CVD process comprising the core 208 and the clad 207. There poses no problem by using other dielectric material.

Figure 2F:
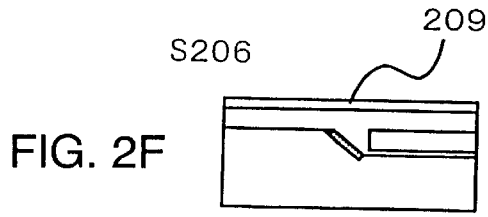

Further, at step S206 shown by FIG. 2F, a surface of the TEOS film having the stepped difference is polished and flattened and a resist film 209 is formed thereabove.

Figure 2G:
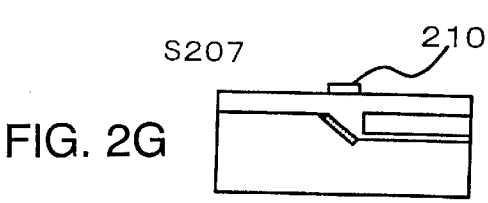

At step S207 shown by FIG. 2G, the resist film 209 is exposed, thereafter, a mask 210 is formed by the photolithography technology. Although not illustrated here, in the case of using the near-field light head as a flying head which is generally used in HDD, a structure necessary for the flying head can be realized by fabricating a mask having a structure necessary for the surface by using the photolithography technology.

Figure 2H:
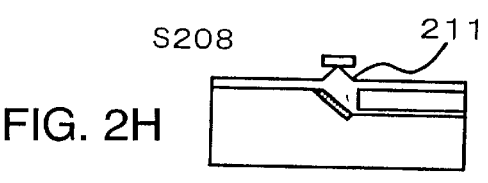

Based on the mask 210 fabricated at step S207, at step S208 shown by FIG. 2H, a projected portion 211 is fabricated by using a chemical etching process.

When wet etching is used, the projected portion 211 of the TEOS film can be fabricated by adjusting the shape of the mask and a rate of underetching under the mask. This utilizes isotropy of wet etching. By adjusting the rate of underetching, there can be formed the projected portion 211 in a shape of a cone having an arbitrary taper angle. When a photoresist is used as a mask, an arbitrary taper angle is formed by adjusting a surface roughness of the TEOS film, a kind of the resist, coating method or baking temperature and optimizing tight adherence between the TEOS film and the resist. There is used a mixed solution of hydrofluoric acid and ammonium fluoride as a wet etchant.

Further, when dry etching is used, etching of the TEOS film is progressed while the shape of the mask is being transcribed and therefore, the mask per se needs to be provided with a projected shape previously. Further, even in dry etching, there is carried out a further different fabrication process when an etching process of a sputtering system is used. In that case, the TEOS film is previously fabricated in a columnar shape or a trapezoidal shape. Thereafter, by carrying out the sputtering system etching, only corners of a column or a trapezoid are ground and there is formed a projected shape having a sharpened front end.

Figure 2I:
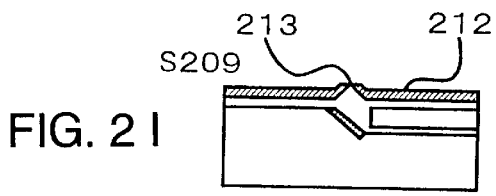

Thereafter, at step S209 shown by FIG. 2I, the unnecessary mask 210 is removed and a metal film is formed to laminate on the surface as a light shielding film 212. A metal film of gold, silver or aluminum having high optical reflectivity is formed by a vacuum deposition process. A film having a small grain size can be formed by a vapor deposition condition having a high deposition rate. As a coating method, the film may be formed by using a sputtering process or an ion plating process. Thereafter, a very small opening 213 is formed by fabricating the light shielding film 212 at the front end portion of the projected portion 211. In forming the light shielding film 212, by depositing the film from an inclined direction of the substrate by a film forming condition having high direction dependency, a thickness of the film at the front end portion tends to thin relative to a thickness thereof at the inclined face of the projected portion 211. By etching the light shielding film 212 having such a thickness distribution, the very small opening 213 can be formed at the front end portion. Further, as other method, it is possible that a mask member having a hole in correspondence with a size of the very small opening 213 at the front end portion is formed on an upper face of the light shielding film 212 and the very small opening is fabricated by selectively etching only the light shielding film 212 at the front end portion. In this case, as the mask of etching, there can be used a mask formed with a hole having a size in correspondence with the very small opening 213 by using a photoresist in a state in which only the front end portion is not coated and the light shielding film 212 is exposed by carrying out spin coating or etching a dielectric member only a front end portion of which is formed to thin by a CVD process.

Further, as other method of fabricating a very small opening, a very small opening may be fabricated by bringing a flat plate having a smooth surface comprising a material harder than the light shielding film 212 into press contact with the light shielding film 212 from above the front end portion of the projected shape 211 and applying constant load weight thereon to thereby change the shape of the front end portion of the light shielding film 212 to be flat to match with the die of the flat plate and expose the under layer of the TOS film. In this case, it is also possible to fabricate the very small opening 213 by bringing the front end portion into press contact not with the flat plate but with a member having a sharpened front end or a member having a spherical front end to thereby fabricate the light shielding film 212 into a shape fitted to the die. Thereafter, a dielectric film (not illustrated) constituting a protective film is formed at an upper face of the light shielding film 212. The protective film is formed to a thickness equal to or smaller than 30 nanometers. By forming the dielectric film, a deterioration of the reflectivity by ageing oxidation of the light shielding film 212 or leakage of light or leakage of light by exfoliation of the light shielding film 212 caused by contact with a medium can be restrained. Further, there also is a case in which the step can be omitted.

Figure 2J:
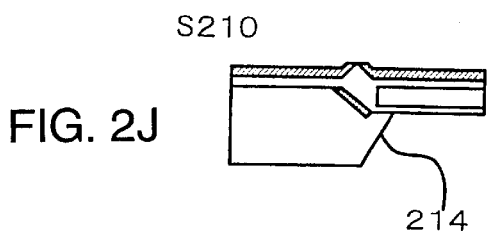

By using the technology of anisotropic etching similar to that in step S201, at step S210 shown by FIG. 2J, a tapered portion 214 is formed and a portion of the clad 207 is exposed from the silicon substrate 201. The exposed clad 207 is fabricated further by using a chemical etching process as necessary. According to the embodiment, a portion of the clad 207 is etched and the core 208 is further exposed.

Next, an explanation will be given of a method of forming near-field light at a vicinity of the very small opening 213 of the near-field light head 301 from the laser 101 in reference to FIG. 4.

The near-field light head 301 fabricated by the fabrication method explained above, is made upside down and the prism 302 is fixed above an exposed portion of the core 208. At this occasion, there is provided an air gap 402 having a pertinent height between the exposed core 208 and the prism 302. The near-field light head 301 fixed with the prism 302 is fixed to the flexure 110.

Diverging light flux emitted from the optical fiber 103 is converted into parallel light flux by the lens 104 and a direction of progress of light flux 403 is bent by the mirror 105 and the light flux 403 is incident on the inclined face of the prism 302. The light flux incident on the inclined face of the prism 302 is refracted in the prism and is reflected by the bottom face of the prism. At this occasion, there is present near-field light on an outer side of the bottom face of the prism 302, the near-field light is coupled with a propagation mode of the waveguide of the core 208 and optical energy is shifted to the waveguide. When propagation speed in the horizontal direction of light propagated in the prism 302, coincides with speed of light propagated in the waveguide under the prism, light is moved from the side of prism 302 to the waveguide of the core 208.

Therefore, light flux 405 is propagated in the core 208 and reflected in the lower direction by the reflection film 204, light flux 406 is incident on the very small opening 213 and near-field light is formed at a vicinity of the very small opening 213.

According to the near-field light head having such a constitution, a distance of an optical path between an emitting end of the optical waveguide comprising the core 208 and the clad 207 and the very small opening 213 of the near-field light head 301 can be shortened. For example, by making a thickness of the laminated silicon oxide film about 10 micrometers, the distance can be set to be equal to or smaller than 10 micrometers. As a result, the propagated light can be irradiated to the very small opening 213 while the beam spot diameter of the propagated light, which is increased as the emitting end becomes remote therefrom, remains to be small and a large amount of near-field light can be formed.

For example, when light flux from the laser is made incident directly on the very small opening of the near-field light head, in the case in which attitude of the near-field light head is changed by the flexure, a positional relationship between the incident light flux and the very small opening is deviated and near-field light formed at a vicinity of the very small opening is rapidly changed. However, according to Embodiment 1, light flux from the laser is once incident on the optical waveguide comprising the core 208 and the clad 207 fabricated in the near-field light head 301, thereby, even when the attitude of the near-field light head 301 is changed by the flexure 110, the positional relationship between the very small opening and the light flux irradiated to the very small opening remains unchanged and stable near-field light is generated at the vicinity of the very small opening.

Next, an explanation will be given of a method of reproducing information recorded on the record medium 107 and recording information in reference to FIG. 1. The near-field light head 106 having the optical coupling portion and having the optical very small opening attached to the front end of the suspension arm 109, is floated up at a constant height by the flying head technology and is made access to an arbitrary data mark present on the record medium 107. There is provided the function of the flexure 110 for stabilizing the attitude in correspondence with waviness of the record medium 107 in order to make the near-field light head 106 having the optical coupling portion follow the record medium 107 rotating at high speed. Light flux emitted from the laser 101 is made incident on the near-field light head 106 having the optical coupling portion by the optical propagating portion and the optical connecting portion. Thereafter, the light flux is guided to the very small opening of the near-field light head 106 having the optical coupling portion and near-field light is generated at a vicinity of the very small opening. Scattered light generated as a result of the interactive action between the near-field light and the record medium 107, is received by the light receiving head 108 fixed to the suspension arm 111, converted into an electric signal and is transmitted to the circuit system 112. The electric signal is amplified as necessary to thereby constitute a reproduced signal of information. Further, recording of information to the record medium 107 is realized by moving the near-field light head 106 having the optical coupling portion and having the very small opening to a desired position of the record medium while making the record medium 107 and the very small opening proximate to each other and irradiating near-field light to the record medium 107 from the very small opening to thereby carry out writing operation.

Although according to the embodiment, the near-field light head 109 for generating near-field light and the light receiving head 108 are respectively attached with the suspension arms, it is also possible that the near-field light head 106 and the light receiving head 108 are integrated and the embodiment is carried out by a single suspension arm.

Further, although there is carried out the illumination mode for generating near-field light from the very small opening and scattering the near-field light by the record medium, the invention can similarly be carried out by the collection mode for generating near-field light at the surface of the record medium and focusing light scattered by the very small opening.

Recording or reproduction at a record density exceeding the diffraction limit of light is realized since there is utilized the interactive action by near-field light in recording or reproducing information to or from the record medium. Although near-field light generated from the very small opening is attenuated by strongly depending upon the distance from the very small opening, since the near-field light head follows movement of the record medium by the flexure structure according to the embodiment, the always stable interactive action is produced and a stable signal output is provided always in recording and reproducing information.

Therefore, as explained above, according to the information recording and reproducing apparatus of the embodiment, even in the information recording and reproducing apparatus using the near-field light head in which the very small opening and the optical waveguide for guiding light to the very small opening are fabricated on the same side, light for generating near-field light can be supplied to the near-field light head and there can be provided the information recording and reproducing apparatus for generating a sufficiently large amount of near-field light from the very small opening of the near-field light head and realizing reproduction and recording with ultra high resolution, recording and reproduction at high speed and high SN ratio formation.

Further, the optical propagating portion is constituted by the lens and the optical fiber for propagating light flux to the mirror which is the optical connecting portion and accordingly, the optical propagating portion can be fixed to the suspension arm and thin shape formation of the apparatus can be carried out. Further, the record media can be overlapped and the suspension arm and the near-field light head can be arranged in correspondence with each of the record media and large capacity formation can be realized.

Further, when light flux from the laser is made parallel light flux by a lens and subjected to aerial propagation to thereby propagate light flux to the mirror which is the optical connecting portion, the optical fiber of the optical propagating portion can be omitted and accordingly, adjustment thereof is further facilitated by reducing a number of parts and a small-sized and light-weighted information recording and reproducing apparatus can be realized.

Furthermore, in order to couple light flux from the optical propagating portion to the optical coupling portion, light flux can be bent by the mirror and aerial propagation of light flux can be used and accordingly, the flexure structure is effectively operated and the near-field light head can continue floating up stably. Further, at the location of aerial propagation, there is constituted a space in which noting is present and accordingly, mass of the optical propagating portion can be lightened and an information recording and reproducing apparatus having a lighter weight can be realized.

Embodiment 2

Figure 5:
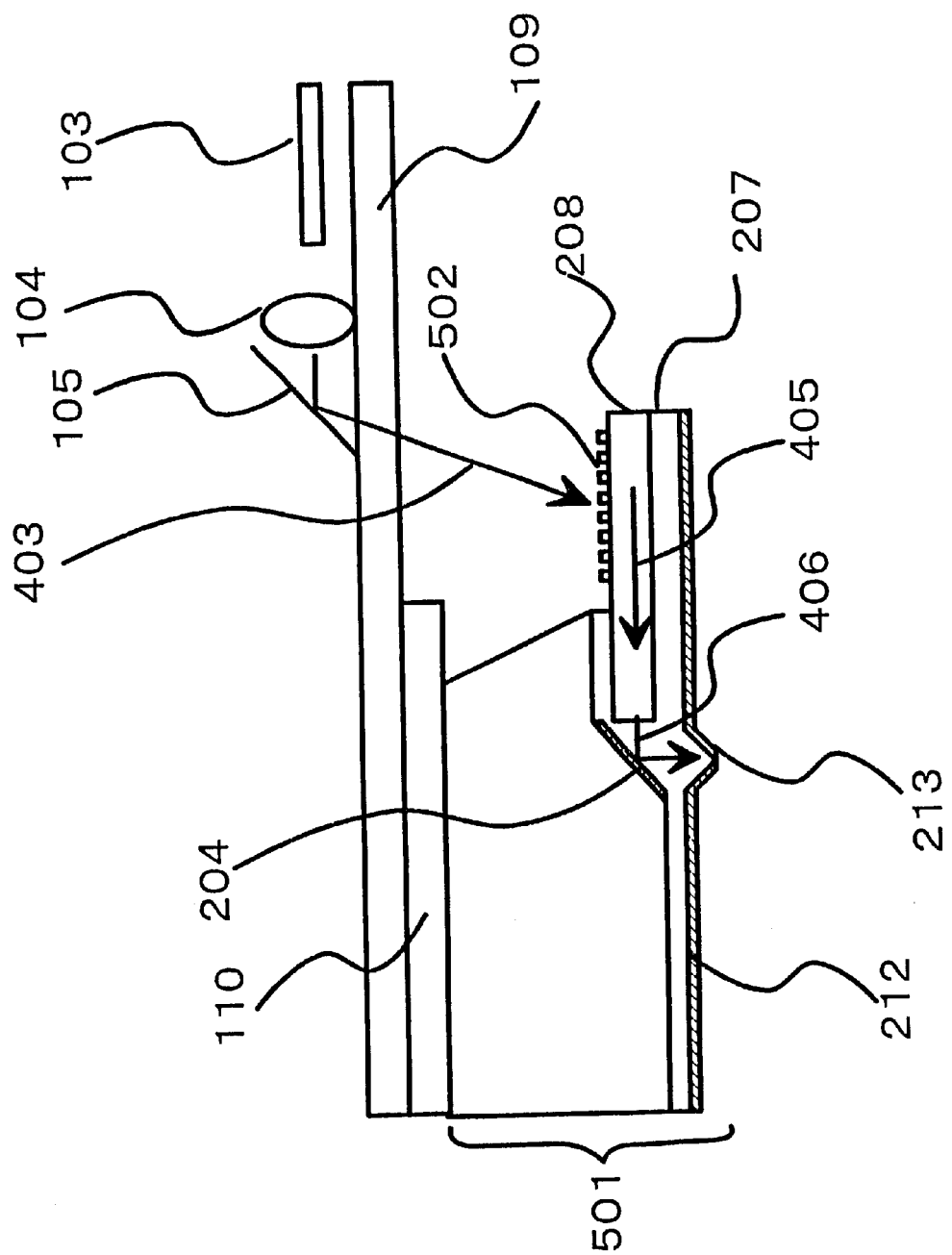
FIG. 5 is an enlarged view showing a vicinity of a near-field light head of an information reproducing apparatus according to Embodiment 2 of the invention.

FIG. 5 shows an enlarged view of a vicinity of a near-field light head of an information reproducing apparatus according to Embodiment 2 of the invention. According to the embodiment, the prism of the optical coupling portion in Embodiment 1 is replaced by a diffraction grating and accordingly, the basic constitution stays the same as in that in Embodiment 1 and accordingly, an explanation thereof will be omitted partially or simplified.

A method of fabricating a near-field light head 501 is almost the same as the fabrication method explained in Embodiment 1. According to the embodiment, a diffraction grating 502 is fabricated by subjecting a clad portion of an optical waveguide on a side thereof different from a side of the very small opening to a chemical etching process.

Next, an explanation will be given of a method of generating near-field light at a vicinity of the very small opening 213 of the near-field light head 501.

Diverged light flux emitted from the optical fiber 103 is converted into parallel light flux by the lens 104, the direction of progress of the light flux 403 is bent by the mirror 105 and the light flux is incident on the diffraction grating 502 fabricated in the near-field light head 501 fixed to the flexure 110. Guided light is excited in the waveguide of the core 308 by the light flux incident on the diffraction grating 502 to thereby provide the light flux 405 propagating at inside of the core 208.

Therefore, the light flux 405 is propagated in the core 308, reflected in the lower direction by the reflection film 204, the light flux 406 is incident on the very small opening 213 and near-field light is generated at a vicinity of the very small opening 213.

An efficiency of coupling light by the diffraction grating 502 is determined by the shape of the diffraction grating, the coupling efficiency of around 50% is provided in the case of a sine wave type diffraction grating and the coupling efficiency near to 100% is provided in the case of a sawtooth type diffraction grating.

Further, although according to the embodiment, the shape of the diffraction grating is fabricated by fabricating the clad portion by the chemical etching process, a diffraction grating may be formed at the waveguide by using other method such as transcription.

With regard to a method of recording and reproducing the information recording and reproducing apparatus using the near-field light head 501, the method is quite the same as that of Embodiment 1 and therefore, an explanation thereof will be omitted.

Therefore, as has been explained, according to the information recording and reproducing apparatus of Embodiment 2, in addition to the effect of the information recording and reproducing apparatus according to Embodiment 1, light flux is coupled to the waveguide by using the diffraction grating and accordingly, in comparison with the case of using the prism, the mass of the near-field light head having the optical coupling portion can be made light, tracking at higher speed can be carried out and data reproduction at higher speed can be carried out. Furthermore, the optical coupling portion can be fabricated only by a process similar to a process of fabricating the near-field optical head and therefore, mass production can be carried out and low cost formation can be achieved.

Embodiment 3

Figure 6:
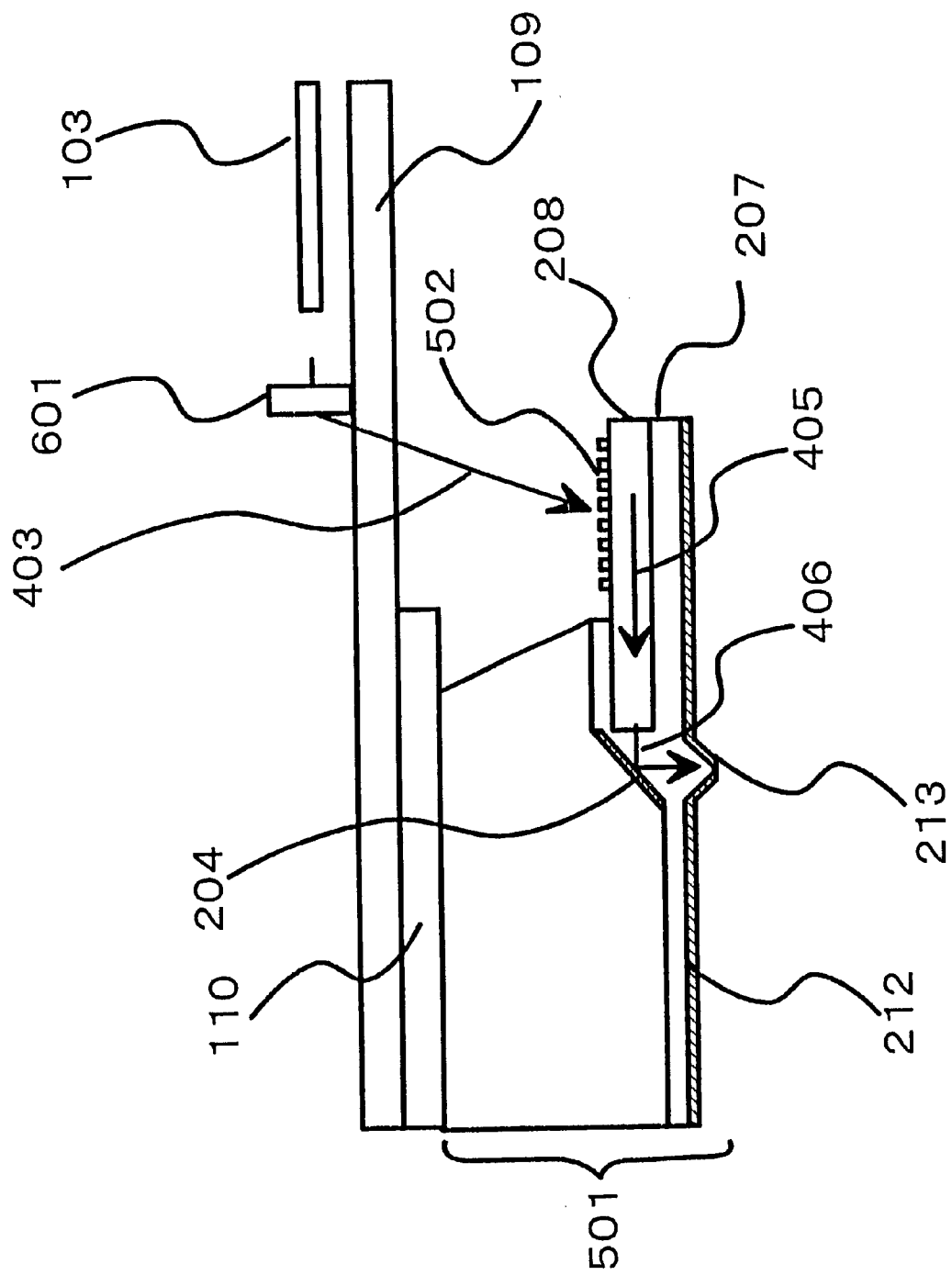
FIG. 6 is an enlarged view showing a vicinity of a near-field light head of an information reproducing apparatus according to Embodiment 3 of the invention.

FIG. 6 shows an enlarged view at a vicinity of a near-field light head of an information reproducing apparatus according to Embodiment 3 of the invention. According to the embodiment, the lens and the mirror at the optical connecting portion according to Embodiment 2 of the invention are replaced by a diffraction grating and accordingly, the basic constitution stays the same as that of Embodiment 2 and accordingly, an explanation thereof will be omitted partially or simplified.

Diffused light flux emitted from the optical fiber 103 is converted into parallel light flux by a diffraction grating 601 fixed to the suspension arm 109 and at the same time, the direction of progress thereof is bent and the light flux is incident on the diffraction grating 502 fabricated at the near-field light head 501. Thereafter, near-field light is generated at a vicinity of the very small opening 213 quite similar to Embodiment 2.

With regard to a method of recording and reproducing of the information recording and reproducing apparatus in the case of using the diffraction grating 601, the method is quite the same as that of Embodiment 2 and therefore, an explanation thereof will be omitted.

Therefore, as has been explained, according to the information recording and reproducing apparatus of Embodiment 3, in addition to the effect of the information recording and reproducing apparatus according to Embodiment 2, in place of two parts (lens and mirror), light is coupled to the waveguide by using a single part (diffraction grating) and accordingly, the mass of the near-field light head can be made lighter, tracking can be carried out at higher speed and data reproduction can be carried out at higher speed.

Furthermore, adjusting portions are also reduced by reducing a number of parts and lower cost formation can be achieved.

Further, the diffraction grating 601 can freely be designed and accordingly, light flux having an optimum light distribution can be made incident on the optical coupling portion and accordingly, optical energy can be utilized further effectively.

Embodiment 4

Figure 7:
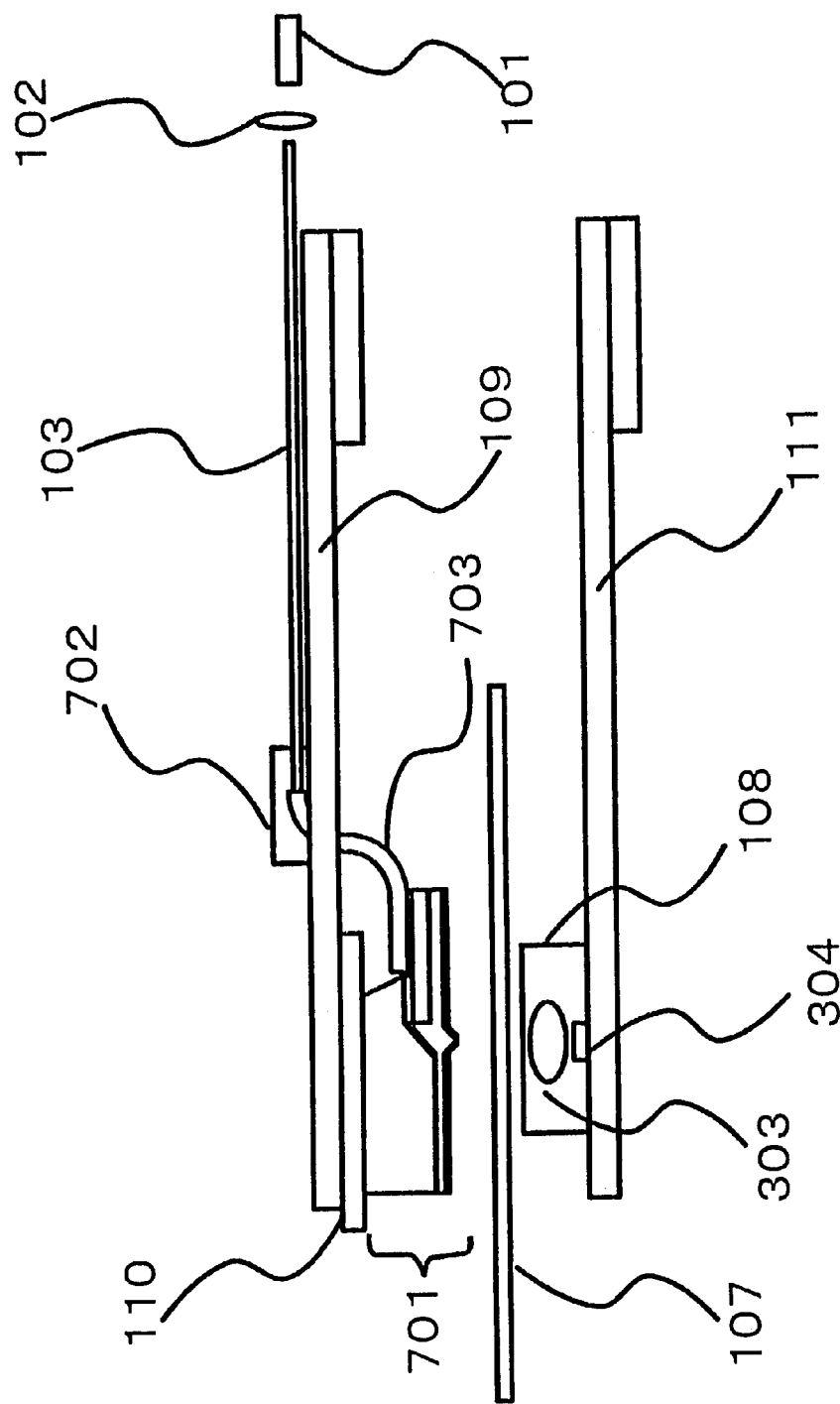
FIG. 7 is a sectional view showing an information recording and reproducing apparatus according to Embodiment 4 of the invention.

FIG. 7 shows a sectional view of an information recording and reproducing apparatus according to Embodiment 4 of the invention. According to the embodiment, the prism constituting the optical coupling portion and the lens and the mirror constituting the optical connecting portion in Embodiment 1 of FIG. 3, are replaced by a waveguide substrate 702 and an optical waveguide 703 and accordingly, an explanation of portions the same as those in Embodiment 1 will be omitted partially or simplified.

Light flux emitted from the laser 101 is made incident on the optical fiber 103 fixed to the suspension arm 109 by the lens 102. The optical fiber 103 is connected to the optical waveguide 703 fabricated above the optical waveguide substrate 702 fixed to the suspension arm and light flux propagated in the optical fiber 103 is propagated in the optical waveguide 703 and is made incident on a near-field light head 701 fixed to the flexure 110. In this case, the flexure 110 is fixed to the suspension arm 109. Further, the optical waveguide 703 is constituted by a core having high refractive index and a clad having lower refractive indexer. Here, the clad is constituted by air having refractive index equal to 1. Naturally, there may be used an optical wareguide comprising a clad having refractive index larger than 1.

An explanation will successively be given of a method of fabricating the optical waveguide 703 fabricated above the optical waveguide substrate 702. First, as a material of the optical waveguide for propagating light, there is deposited a quarts species material such as silicon oxide or silicon nitride or a dielectric material of polymer such as polyimide or polymethacrylic acid on a silicon substrate. In the case of silicon oxide which is a dielectric material, silicon oxide can easily be formed by a sputtering process, a CVD process or a vacuum deposition process. The optical waveguide may be formed by a core and a clad having different refractive indices. In order to make the refractive index of the core larger than the refractive index of the clad, in forming the core, germanium may be doped, further, in order to make the refractive index of the clad smaller than the refractive index of the core, in forming the clad, fluorine may be doped. In such a case, light is propagated by being reflected totally by the core and accordingly, propagation loss can be reduced.

Thereafter, by using the photolithography technology and etching, the shape of the optical waveguide is adjusted. By using the photolithography technology used in normal semiconductor fabricating steps, a mask member for protecting etching is laminated on the optical waveguide and patterning is carried out. Thereafter, the optical waveguide can be patterned by etching the material of the optical waveguide and removing the mask member. Thereafter, silicon at other than the optical waveguide substrate 702 is removed by etching, the optical waveguide 703 fabricated on the optical waveguide substrate 702 is fabricated and is erected on and fixed to the suspension arm 109. Here, in order to form an optical waveguide having a three layer structure surrounding the core by the clad, a layer having low refractive index is formed to laminate by a TEOS film by a CVD process and the shape of the optical waveguide is adjusted by utilizing the photolithography technology. Further, there poses no problem by using other dielectric material.

Further, the near-field light head 701 can be fabricated similar to the near-field light head used in Embodiment 1. According to the near-field light head 701, it is not necessary to fabricate the clad portion of the optical waveguide fabricated in the near-field light head as explained in Embodiment 1 and the clad portions stays to be flat.

Figure 8:
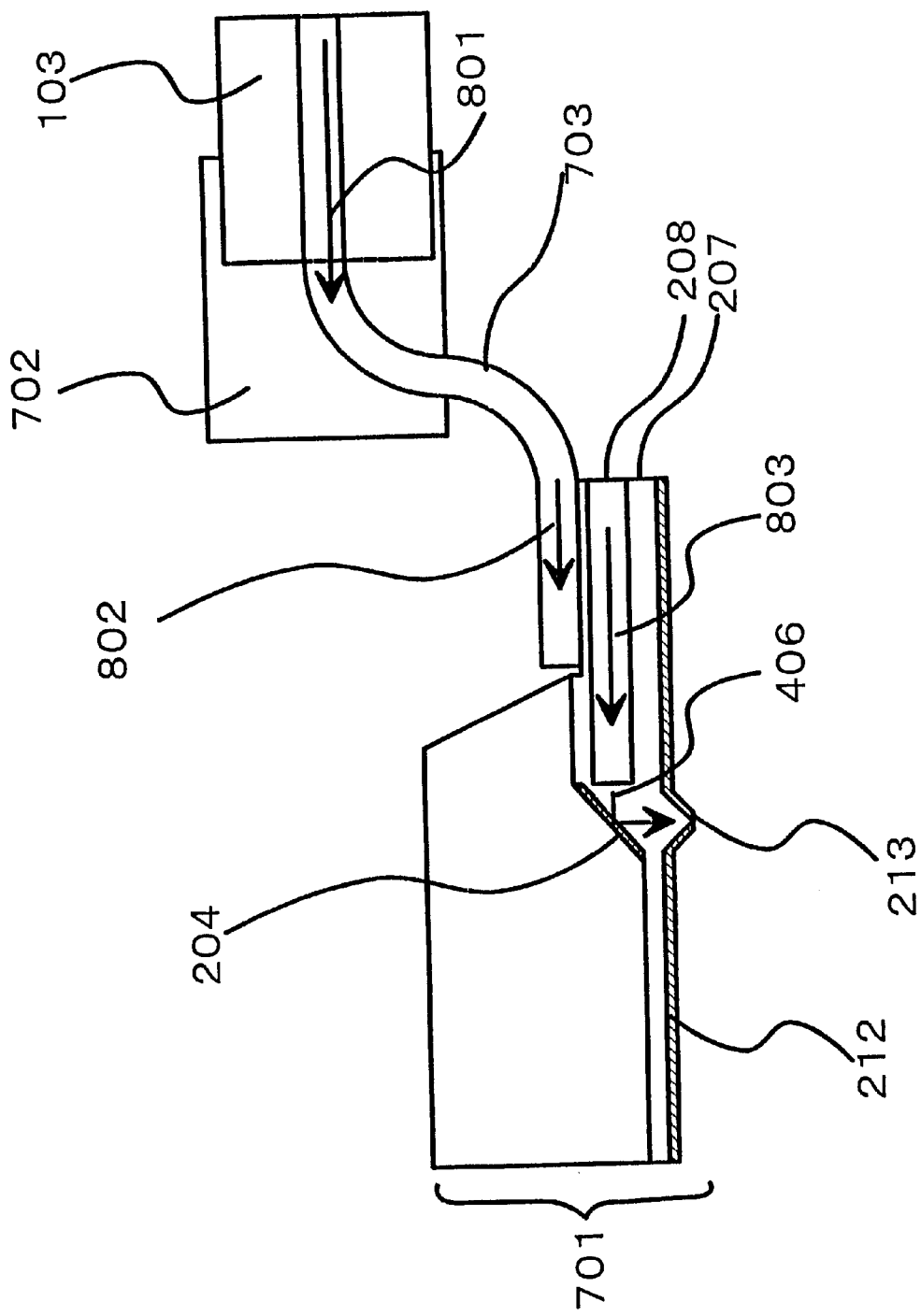
FIG. 8 is an enlarged view showing a vicinity of a near-field light head of an information reproducing apparatus according to Embodiment 4 of the invention.

FIG. 8 shows an enlarged view of a vicinity of the near-field light head of the information reproducing apparatus according to Embodiment 4 of the invention. Further, in FIG. 8, to facilitate the explanation, the suspension arm 109 and the flexure 110 in FIG. 7 are omitted. The optical waveguide 703 is connected to the optical waveguide comprising the core 208 and the clad 207 fabricated in the near-field light head 701. The two waveguides are proximate to each other in a region having a constant length and can exchange energy of light flux propagated between the waveguides.

An explanation will be given of principle of the phenomenon as follows. Assume that light flux of a TEO mode is propagated to an optical waveguide having a three layer structure. When influence of a tapered portion is disregarded for simplicity, it is considered that at a portion at which the two waveguide are arranged to be proximate to each other, the waveguides are abruptly changed into a five layer optical waveguide. A location at which the three layer optical waveguide is changed to the five layer optical waveguide is defined as z=0 and a location at which the five layer optical waveguide is thereafter changed to the three layer optical waveguide is defined as z=L. Then, the TEO mode of the optical waveguide having the three layer structure, excites the TEO mode and a TE1 mode having an equal amplitude at the portion of the five layer optical waveguide which is a section of 0<z<L and a phase relationship between the two modes at this occasion is determined such that electromagnetic wave is not present on other side of the three layer optical waveguide. The two modes of TEO and TE1 propagating in the five layer optical waveguide, are provided with different phase speeds and therefore, there is produced a relative shift of phase. When the phase shift is constituted to be $^1$ at z=L, an electric field distribution produced by overlapping the two modes, almost coincides with the TEO mode of the three layer optical waveguide at z>L. As a result, energy of light flux propagated in one waveguide is moved to a waveguide mode of other optical waveguide and accordingly, energy of propagated light flux can be exchanged between the two waveguides.

Accordingly, light flux 801 emitted from the optical fiber 803 becomes light flux 103 propagated in the core 208 of the optical waveguide fabricated in the near-field light head 701. Thereafter, the light flux 803 is reflected in the lower direction by the reflection film 204, the light flux 406 is made incident on the very small opening 213 and near-field light is generated at a vicinity of the very small opening 213.

With regard to a method of recording and reproducing the information recording and reproducing apparatus in the case of using the optical waveguide 703, the method is quite the same as that of Embodiment 1 and therefore, an explanation thereof will be omitted.

Therefore, as has been explained, according to the information recording and reproducing apparatus of Embodiment 4, in addition to the effect of the information recording and reproducing apparatus according to Embodiment 1, the fabrication process can be simplified since it is not necessary to fabricate the clad portion of the optical waveguide fabricated in the near-field light head. Further, light is coupled to the optical waveguide fabricated in the near-field light head by using a single part (optical waveguide substrate having optical waveguide) in place of the two parts (lens and mirror) and accordingly, in comparison with the case of using the prism, optical adjustment is much simplified, adjusting portions are reduced since a number of parts is reduced and lower cost formation can be achieved. Further, the mass of the near-field light head can be lightened and accordingly, tracking at higher speed can be carried out and data reproduction at higher speed can be carried out.

Embodiment 5

Figure 9:
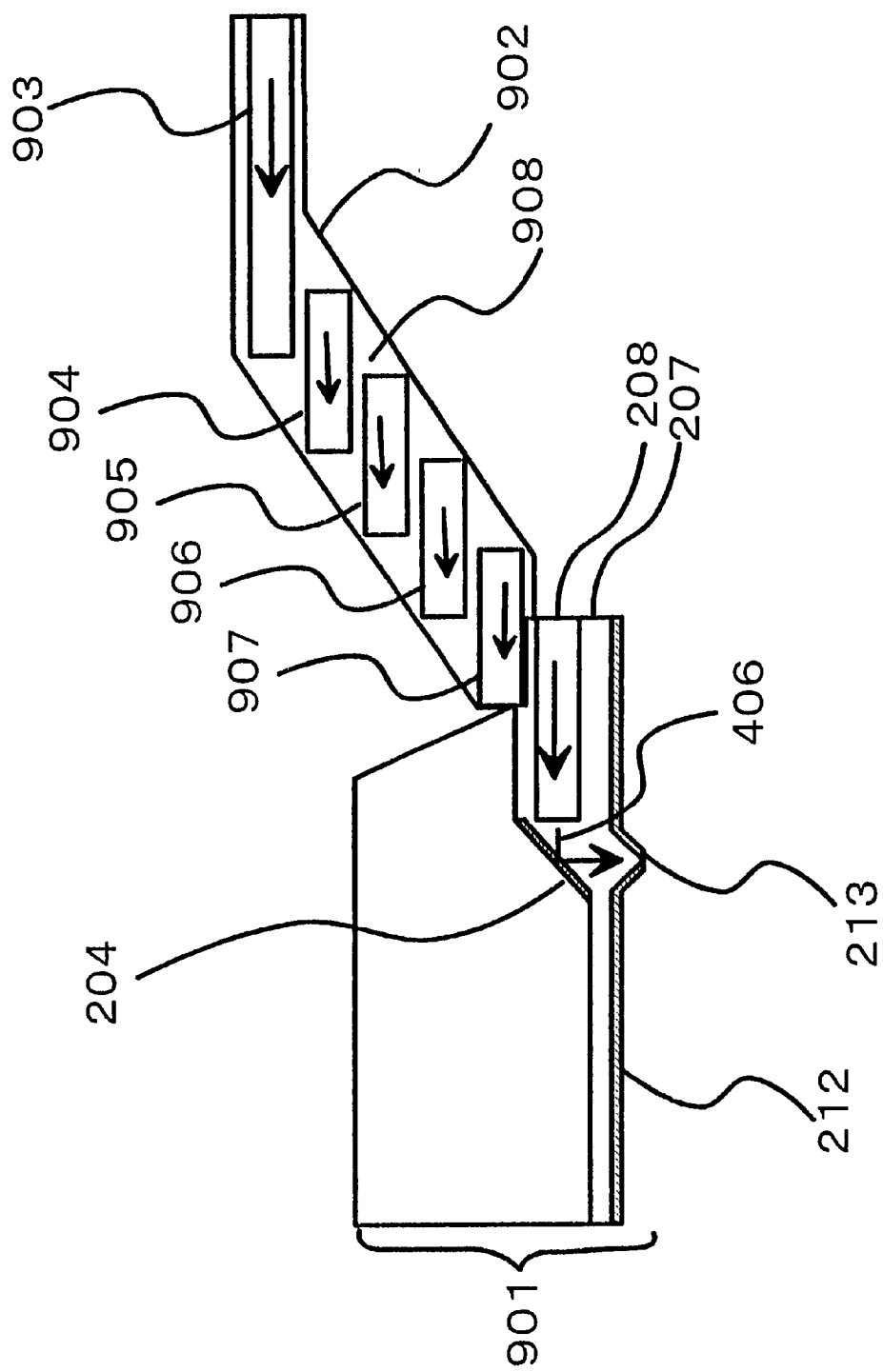
FIG. 9 is an enlarged view showing a vicinity of a near-field light head of an information reproducing apparatus according to Embodiment 5 of the invention.

FIG. 9 shows an enlarged view of a vicinity of a near-field light head of an information reproducing apparatus according to Embodiment 5 of the invention. According to the embodiment, the optical fiber and the optical waveguide substrate having the optical waveguide in Embodiment 4 are replaced by a single multiple layer optical waveguide, the basic constitution is the same as that of Embodiment 4 and therefore, an explanation thereof will be omitted partially or simplified. Similar to the case of Embodiment 4 shown by FIG. 8, also in FIG. 9, to facilitate the explanation, the suspension arm and the flexure are omitted.

A core 903 fabricated in the multiple layer optical waveguide 902, propagates light flux emitted from the laser constituting the light source to a vicinity of a near-field light head 901 fixed to the flexure. Thereafter, cores 904, 905, 906 and 907 are arranged in steps and intervals thereamong are covered by a clad 908 having refractive index lower than that of the core. Such a multiple layer optical waveguide can be fabricated by a method similar to the method of fabricating the optical waveguide explained in Embodiment 4.

The multiple layer optical waveguide 902 is fixed to the suspension arm (not illustrated). Light flux emitted form the laser is made incident on the core 903 of the optical waveguide of the multiple layer optical waveguide 902 by the lens. According to light flux propagated in the core 903, as explained in Embodiment 4, energy of light flux is coupled to the waveguides arranged to be proximate to each other at a region of a constant length and propagated light is provided at the core 904. Thereafter, successively, light flux is shifted to the core 905, the core 906 and the core 907 and finally, quite similar to Embodiment 4, there is constituted light flux propagated in the optical waveguide comprising the core 208 and the clad 207 of the near-field light head 901. Thereafter, similar to Embodiment 4, near-field light is formed at a vicinity of the very small opening 213.

With regard to a method of recording and reproducing the information recording and reproducing apparatus in the case of using the multiple layer optical waveguide 902, the method is quite the same as that of Embodiment 1 and therefore, an explanation thereof will be omitted.

Therefore, as has been explained, according to the information recording and reproducing apparatus of Embodiment 5, in addition to the effect of the information recording and reproducing apparatus according to Embodiment 4, the optical waveguide fabricated in the near-field light head is coupled by using a single part (multiple layer optical waveguide) in place of two parts (optical fiber and optical waveguide substrate having optical waveguide) and accordingly, optical adjustment is further simplified and adjusting portions thereof are reduced by reducing a number of parts and lower cost formation can be achieved. Further, the mass of the near-field light head can be lightened and therefore, tracking at higher speed can be carried out and data reproduction at higher speed can be carried out.

As has been explained, according to the information reproducing and recording apparatus of the first aspect of the invention, there can be provided the information recording and reproducing apparatus capable of supplying the light for generating the near-field light to the near-field light head by supplying the light flux from the light source by the optical propagating portion and the optical connecting portion and the optical coupling portion, generating a sufficiently large amount of the near-field light at a vicinity of the very small opening of the near-field light head and realizing reproduction and recording with ultra high resolution, recording and reproduction at high speed and high SN ratio formation even in the information recording and reproducing apparatus using the near-field light head in which the very small opening and the optical waveguide for guiding light to the very small opening are fabricated on the same side.

As has been explained, according to the information recording and reproducing apparatus of the second aspect of the invention, in addition to the effect of the information recording and reproducing apparatus according to the first aspect of the invention, the light flux from the light source can be supplied to the near-field light head by a simple constitution and accordingly, the low cost formation can be achieved.

As has been explained, according to the information recording and reproducing apparatus of the third aspect of the invention, in addition to the effect of the information recording and reproducing apparatus according to the first aspect of the invention, the light flux is coupled to the waveguide by using the diffraction grating and accordingly, in comparison with the case of using the prism, the mass at a surrounding of the near-field optical head can be lightened, tracking at higher speed can be carried out and data reproduction at higher speed can be carried out. Furthermore, the optical coupling portion can be fabricated only by a process similar to the process of fabricating the near-field light head and accordingly, mass production can be carried out and low cost formation can be achieved.

As has been explained, according to the information recording and reproducing apparatus of the fourth aspect of the invention, in addition to the above-described effect, adjustment is facilitated by reducing a number of parts, adjusting portions are reduced and lower cost formation can be achieved. Further, the mass of the near-field light head can be lightened and accordingly, tracking at faster speed can be carried out and data production at higher speed can be carried out.

As has been explained, according to the information recording and reproducing apparatus of the fifth aspect of the invention, in addition to the effect of the information recording and reproducing apparatus according to the first aspect of the invention, it is not necessary to fabricate a clad portion of the optical waveguide fabricated in the near-field light head and accordingly, the fabrication process can be simplified. Further, the number of parts can be reduced and accordingly, in comparison with the case of using the prism or the diffraction grating, optical adjustment is much simplified, adjusting portions are reduced by reducing the number of parts and lower cost formation can be carried out. Further, the mass of the near-field light head can be lightened and therefore, tracking at higher speed can be carried out and data reproduction at higher speed can be carried out.

As has been explained, according to the information recording and reproducing apparatus of the sixth aspect of the invention, in addition to the above-described effect, the optical propagating portion is constituted by the lens and the optical waveguide for propagating the light flux to the optical connecting portion and accordingly, the optical propagating portion can be fixed to the suspension arm and thin shape formation of the apparatus can be carried out. Further, it is possible to overlap the record media and arrange suspension arms and near-field light heads in correspondence with the respective record media and large capacity formation can be realized.

As has been explained above, according to the information recording and reproducing apparatus of the seventh aspect of the invention, in addition to the effect of the information recording and reproducing apparatus according to the first through the fourth and the sixth aspects of the invention, the optical waveguide can be omitted and accordingly, adjustment is further facilitated by reducing the number of parts and a small-sized and light-weighted information recording and reproducing apparatus can be realized.

As has been explained above, according to the information recording and reproducing apparatus of the eighth aspect of the invention, in addition to the effect of the information recording and reproducing apparatus according to the first through the fourth, the sixth and the seventh aspects of the invention, in order to couple the light flux from the optical propagating portion to the optical coupling portion, the light flux is bent by the mirror and aerial propagation can be used and accordingly, the flexure structure can effectively be operated and the near-field light head can continue floating up stably. Furthermore, at the location of the aerial propagation, there is constituted a space in which nothing is present and accordingly, mass of the light propagating portion can be lightened and a further light-weighted information recording and reproducing apparatus can be realized.

As has been explained, according to the information recording and reproducing apparatus of the ninth aspect of the invention, in addition to the effect of the information recording and reproducing apparatus according to the first through the fourth and the sixth through the eighth aspects of the invention, the diffraction grating can freely be designed and accordingly, the light flux having an optimum light distribution can be made incident on the optical coupling portion and accordingly, optical energy can be utilized further effectively.

What is claimed is:

1. An information recording and reproducing apparatus for at least one of recording and reproducing information on a recording medium utilizing near-field light, the information recording and reproducing apparatus comprising:
   a suspension arm;
   a flexure connected to the suspension arm;
   a near-field light head connected to the flexure, the near-field light head having a minute aperture, an optical waveguide for propagating light flux from a light source, and a reflection film for reflecting the light flux propagated by the optical waveguide and for irradiating the reflected light flux to the minute aperture to generate near-field light at the minute aperture for interaction with a recording medium;
   a light guiding structure for guiding light flux from the light source to the optical waveguide, the light guiding structure having an optical propagating portion connected to the suspension arm, an optical coupling portion connected to the near-field light head, and an optical connecting portion for optically connecting the optical propagating portion to the optical coupling portion; and
   a light receiving head for receiving scattered light generated as a result of the interaction between near-field light generated at the minute aperture of the near-field light head and the recording medium.

2. An information recording and reproducing apparatus according to claim 1; wherein the optical coupling portion comprises an air gap formed in the near-field light head and a prism disposed over the air gap for optically coupling the light flux from the light source with a propagation mode of the optical waveguide.

3. An information recording and reproducing apparatus according to claim 2; wherein the optical waveguide comprises a core and a clad disposed on the core; and wherein the air gap formed in the near-field light head exposes a portion of the clad to the prism.

4. An information recording and reproducing apparatus according to claim 1; wherein the optical coupling portion comprises a diffraction grating.

5. An information recording and reproducing apparatus according to claim 1; wherein the optical coupling portion comprises at least two overlapping optical waveguides.

6. An information recording and reproducing apparatus according to claim 1; wherein the optical coupling portion and the optical connecting portion comprise at least one optical waveguide.

7. An information recording and reproducing apparatus according to claim 1; wherein the optical propagating portion comprises an optical waveguide and a lens for focusing the light flux from the light source to an end face of the optical waveguide.

8. An information recording and reproducing apparatus according claim 1; wherein the optical propagating portion comprises a lens for directing the light flux from the light source in parallel relation to a main surface of the suspension arm.

9. An information recording and reproducing apparatus according to claim 1; wherein the optical connecting portion comprises a mirror for changing an optical path of light flux from the optical propagating portion so that the light flux from the optical propagating portion is made incident on the optical coupling portion.

10. An information recording and reproducing apparatus according to claim 1; wherein the optical connecting portion comprises a diffraction grating for changing an optical path of light flux from the optical propagating portion so that the light flux from the optical propagating portion is made incident on the optical coupling portion.

11. An information recording and reproducing apparatus according to claim 1; wherein the near-field light head comprises a substrate having a first side connected to the flexure and a second side opposite to the first side; and wherein the minute aperture and the optical waveguide of the near-field light head are disposed on the second side of the substrate.

12. An information recording and reproducing apparatus according to claim 1; wherein a distance of an optical path between a light flux emitting end of the optical waveguide and the minute aperture is equal to or smaller than 10 micrometers.

13. An information recording and reproducing apparatus for at least one of recording and reproducing information on a recording medium utilizing near-field light, comprising: a light source for generating light; a suspension arm; a near-field light head mounted on the suspension arm, the near-field light head having a minute aperture, an optical waveguide for propagating light from the light source, and a reflection film for reflecting the light propagated by the optical waveguide and for irradiating the reflected light to the minute aperture to generate near-field light at the minute aperture for interaction with a recording medium; and light guiding means for guiding light from the light source to the optical waveguide of the near-field light head.

14. An information recording and reproducing apparatus according to claim 13; wherein the light guiding means comprises an optical propagating portion connected to the suspension arm, an optical coupling portion connected to the near-field light head, and an optical connecting portion for optically connecting the optical propagating portion to the optical coupling portion.

15. An information recording and reproducing apparatus according to claim 14; wherein the optical coupling portion comprises an air gap formed in the near-field light head and a prism connected to the near-field light head and disposed over the air gap for optically coupling light from the light source with a propagation mode of the optical waveguide.

16. An information recording and reproducing apparatus according to claim 15; wherein the optical waveguide comprises a core and a clad disposed on the core; and wherein the air gap formed in the near-field light head exposes a portion of the clad to the prism.

17. An information recording and reproducing apparatus according to claim 14; wherein the optical coupling portion comprises a diffraction grating formed on the near-field light head for receiving light from the light source and for coupling the light from the light source with a propagation mode of the optical waveguide.

18. An information recording and reproducing apparatus according to claim 13; further comprising a light receiving head for receiving scattered light generated as a result of the interaction between near-field light generated at the minute aperture of the near-field light head and the recording medium.

19. An information recording and reproducing apparatus according to claim 13; wherein the near-field light head comprises a substrate having a first side mounted on the suspension arm and a second side opposite to the first side; and wherein the minute aperture and the optical waveguide of the near-field light head are disposed on the second side of the substrate.

20. An information recording and reproducing apparatus according to claim 13; wherein a distance of an optical path between a light emitting end of the optical waveguide and the minute aperture is equal to or smaller than 10 micrometers.

21. A near-field optical head for at least one of recording and reproducing information on a recording medium utilizing near-field light, comprising: a substrate; a hole formed in the substrate so as to define a minute aperture at one end of the hole; an optical waveguide path formed in the substrate for propagating light; and a reflection film disposed in the substrate for reflecting the light propagated by the optical waveguide and for irradiating the reflected light to the minute aperture to generate near-field light at the minute aperture for interaction with a recording medium.

22. A near-field optical head according to claim 21; wherein the substrate has a first side and a second side opposite to the first side; and wherein the minute aperture and the optical waveguide of the near-field light head are disposed on the second side of the substrate.

23. A near-field optical head according to claim 21; wherein a distance of an optical path between a light emitting end of the optical waveguide and the minute aperture is equal to or smaller than 10 micrometers.

24. A near-field optical head according to claim 21; further comprising an optical coupling portion for optically coupling light from the light source with a propagation mode of the optical waveguide.

25. A near-field optical head according to claim 24; wherein the optical coupling portion comprises an air gap formed in the substrate and a prism connected to the substrate and disposed over the air gap.

26. A near-field optical head according to claim 25; wherein the optical waveguide comprises a core and a clad disposed on the core; and wherein the air gap formed in the near-field light head exposes a portion of the clad to the prism.

27. A near-field optical head according to claim 24; wherein the optical coupling portion comprises a diffraction grating formed on the substrate.

* * * * *